US007050256B1

(12) United States Patent
Oakley (10) Patent No.: US 7,050,256 B1
(45) Date of Patent: May 23, 2006

(54) FAST ERASE METHOD AND APPARATUS FOR DIGITAL MEDIA

(75) Inventor: Ernest C. Oakley, Pasadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 191 days.

(21) Appl. No.: 10/885,529

(22) Filed: Jun. 29, 2004

(51) Int. Cl.
*G11B 5/03* (2006.01)

(52) U.S. Cl. ....................................................... 360/66

(58) Field of Classification Search ...................... None
See application file for complete search history.

(56) References Cited

U.S. PATENT DOCUMENTS

| | | | |
|---|---|---|---|
| 4,495,530 A | | 1/1985 | Yanagida |
| 4,581,661 A | | 4/1986 | Uehara et al. |
| 4,613,919 A | | 9/1986 | Miyatake et al. |
| 4,686,661 A | | 8/1987 | Isaka |
| 4,712,203 A | | 12/1987 | Saito et al. |
| 4,794,560 A | | 12/1988 | Bell et al. |
| 4,813,007 A | * | 3/1989 | Tanoshima et al. ........ 346/74.5 |
| 4,888,750 A | | 12/1989 | Kryder et al. |
| 4,922,462 A | | 5/1990 | Ikegawa et al. |
| 5,056,081 A | | 10/1991 | Hsieh |
| 5,177,717 A | * | 1/1993 | Sato et al. ..................... 369/14 |
| 5,184,335 A | | 2/1993 | Kryder et al. |
| 5,206,843 A | | 4/1993 | Kaburagi |
| 5,231,614 A | | 7/1993 | Shindo et al. |
| 5,293,361 A | | 3/1994 | Aizawa |
| 5,319,619 A | | 6/1994 | Shindo et al. |
| 5,852,595 A | | 12/1998 | Matsui |
| 5,954,569 A | | 9/1999 | Hutchison et al. |
| 6,014,279 A | | 1/2000 | Yamagata |
| 6,233,206 B1 | | 5/2001 | Hamann et al. |
| 6,317,280 B1 | | 11/2001 | Nakajima et al. |
| 6,493,183 B1 | * | 12/2002 | Kasiraj et al. ............... 360/126 |
| 6,947,235 B1 | * | 9/2005 | Albrecht et al. ............... 360/55 |
| 2002/0006082 A1 | | 1/2002 | Miyake et al. |
| 2003/0235120 A1 | | 12/2003 | Nakayama et al. |

\* cited by examiner

*Primary Examiner*—Wayne Young
*Assistant Examiner*—Daniell L. Negrón
(74) *Attorney, Agent, or Firm*—Mark Homer (57) ABSTRACT

A non-contact fast erase method for erasing information stored on a magnetic or optical media. The magnetic media element includes a magnetic surface affixed to a toroidal conductor and stores information in a magnetic polarization pattern. The fast erase method includes applying an alternating current to a planar inductive element positioned near the toroidal conductor, inducing an alternating current in the toroidal conductor, and heating the magnetic surface to a temperature that exceeds the Curie-point so that information stored on the magnetic media element is permanently erased. The optical disc element stores information in a plurality of locations being defined by pits and lands in a toroidal conductive layer. The fast erase method includes similarly inducing a plurality of currents in the optical media element conductive layer and melting a predetermined portion of the conductive layer so that the information stored on the optical medium is destroyed.

11 Claims, 9 Drawing Sheets

FAST ERASE METHOD AND APPARATUS FOR DIGITAL MEDIA

FIELD OF THE INVENTION

The present invention relates to erasure of data, and more particularly to the permanent erasure of data held on magnetic and optical media.

DESCRIPTION OF RELATED ART

Previously, the permanent erasure of data stored on magnetic and optical media was a time consuming task. Diplomatic and military installations put national secrets at risk if they are overrun by hostile forces while sensitive data stored on the magnetic and optical media is not erased. Hence, security services for the diplomatic and military installations have devised measures to ensure sensitive data is rendered unreadable and cannot fall into unfriendly hands.

One measure employed for many years in the field of electronic devices has been the use of a Thermite bomb which consists of a mixture of powdered magnesium and powdered iron that burns with an extremely hot flame once ignited. Typically, a Thermite bomb is usually packaged in a small container and mounted inside sensitive equipment, near to the device that will need to be incinerated to destroy sensitive information. Igniting Thermite is sometimes unreliable, and even when properly ignited it may be only partially effective in destroying the sensitive information. Additionally, burning Thermite poses a safety hazard to personnel who are attempting to complete a destruction sequence.

Magnetic Hard-Disc Drives (HDD) are mass data storage media which combine a steady lowering of cost with increasingly available storage capacity. Previously, thorough erasure of information stored on these devices required slow, multiple over-writes with random data to all relevant areas of the medium in order to completely eradicate the sensitive information. The Department of Defense (DOD) has recommended thirty-five (35) over-writes with random data to assure complete obscuration of the originally stored data at a particular location. These multiple over-writes necessarily require that the drive-motor and read/write logic for the HDD be energized and properly working. Magnetic material can be bulk-erased, or degaussed, with a high-energy alternating magnetic field. This technique may be of only limited effectiveness for use with HDDs because of the presence of metallic platters that can partially shield the ferromagnetic surface from a degaussing field.

Sensitive information may be recorded and distributed on optical discs, such as compact discs (CDs), which are advantageous due to their low cost, high storage density, and reliability. However, destruction of the information on the optical disc typically requires a manual step of cutting or pulverizing the optical disc in order to render the information unreadable. Alternatively, incineration of the optical disc may also be used, as discussed above, with the corresponding hazards and slow destruction time. A previous attempt to address the problem of destruction of data in optical media is taught in U.S. Pat. No. 5,954,569 to Huchison, et al. and includes grinding away the information bearing surface (IBS) which is an internal layer of the optical disc. This process still requires a time consuming, manual step that may not be practical in an imminent threat situation. Thus, there remains a need to rapidly, safely, reliably, and permanently erase data held on magnetic media such as a HDD or an optical media element.

BRIEF SUMMARY OF THE INVENTION

The present invention, as defined in the claims, describes a fast erasure method and apparatus for a magnetic media device such as a Hard Disc Drive (HDD) with the additional advantage of not constituting a safety hazard to personnel as may occur with the burning of Thermite. The present invention teaches a method and apparatus for heating, through a non-contact method, a metallic platter within the HDD that carries a magnetic surface upon which information is stored. Thus, the present invention does not affect the basic design of the HDD. The metallic platter is excited with an alternating current field coupled magnetically in a manner similar to an electrical transformer.

In one embodiment, the fast erase method for a magnetic media element includes the steps of applying a first alternating current for a period of time to a planar inductive element positioned near a toroidal conductor that has a magnetic surface for storing information in a magnetic polarization pattern on the magnetic media element. The first alternating current applied to the planar inductive element generates an alternating magnetic field that is coupled to the toroidal conductor in a non-contacting manner and induces a second alternating current within the toroidal conductor. The second alternating current is dissipated as heat within the toroidal conductor which raises the temperature of the affixed magnetic surface to exceed the Curie-point for the magnetic surface where the magnetic polarization pattern is disturbed and information stored on the magnetic media element is destroyed. Alternatively, the magnetic surface may be affixed to a magnetically inert substrate such as ceramic, glass, or a ceramic-glass composite. In this case, the second alternating current is induced within the magnetic surface and is dissipated within the magnetic surface to raise the temperature of the magnetic surface directly above the Curie-point as described.

In another embodiment, the fast erase method may be applied to information stored in an optical media element. The optical media element stores information in a substantially planar metallic layer using a plurality of alternating pits and lands that are positioned alternately above or below the substantially planar metallic layer. A first alternating current is applied to a planar inductive element positioned near the optical media element. Similar to the discussion above, the alternating current applied to the planar inductive element generates an alternating magnetic field that induces secondary currents in the plurality of conducting paths in the substantially planar optical media metallic film. The secondary currents melt a portion of the metallic film so that the information stored on the optical medium is obscured.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention describes a fast erase method for a Hard Disc Drive (HDD) with the additional advantage of not constituting a safety hazard to personnel. The present invention teaches heating, through a non-contact method, a metallic platter within the HDD that carries a magnetic surface upon which information is stored. Thus, the present invention does not affect the basic design of the HDD. The metallic platter is excited with an alternating current field coupled magnetically in a manner similar to an electrical transformer.

The method taught by the present invention has an advantage that the HDDs do not need to be energized or rotating to effect complete obscuration of data. The present invention teaches effectively and destructively erasing data by heating the HDD platters to the Curie-point temperature ($T_{CP}$) of a ferromagnetic coating forming a metallic surface that has been affixed to the metallic platter. At the Curie-point temperature, or simply Curie-point, a magnetic substance will lose its permanent magnetization. When the magnetic substance cools, it no longer retains its former recorded data patterns. That is, the information that had been encoded in the orientation of magnetic dipoles in the magnetic surface will have become randomized rather than organized, resulting in the permanent erasure of the previously encoded information.

The Curie-point of various ferromagnetic materials is well known: Iron is about 1043° K, Cobalt is about 1388° K, and Nickel is about 627° K. Similarly, the Melting-point (fusion) temperature ($T_{MP}$) of various ferromagnetic materials is also well known: Iron is about 1808° K, Cobalt is about 1768° K, and Nickel is about 1726° K. It must be noted that the Curie-point temperature can be reached at point somewhat below the Melting-point temperature for a ferromagnetic substance. Thus, a ferromagnetic material may be heated to a temperature above the Curie-point, but below the melting point, so that any information stored on the ferromagnetic surface is erased without creating a hazardous condition such as a fire. The metallic platter can be composed of a high melting temperature metal or metal alloy, such as a solid disc of ferromagnetic material, if the ferromagnetic material coating is to be heated above the Curie-point temperature. However, the metallic platter may also be composed of aluminum and other alloys, with the melting point of aluminum being about 933° K. If the platter is composed of aluminum, the platter itself will likely melt before the ferromagnetic material affixed to the surface of the aluminum platter reaches the Curie-point. Even so, the goal of complete obscuration of stored information is achieved in an alternative manner by the destruction of the metallic platter itself.

Figure 1:
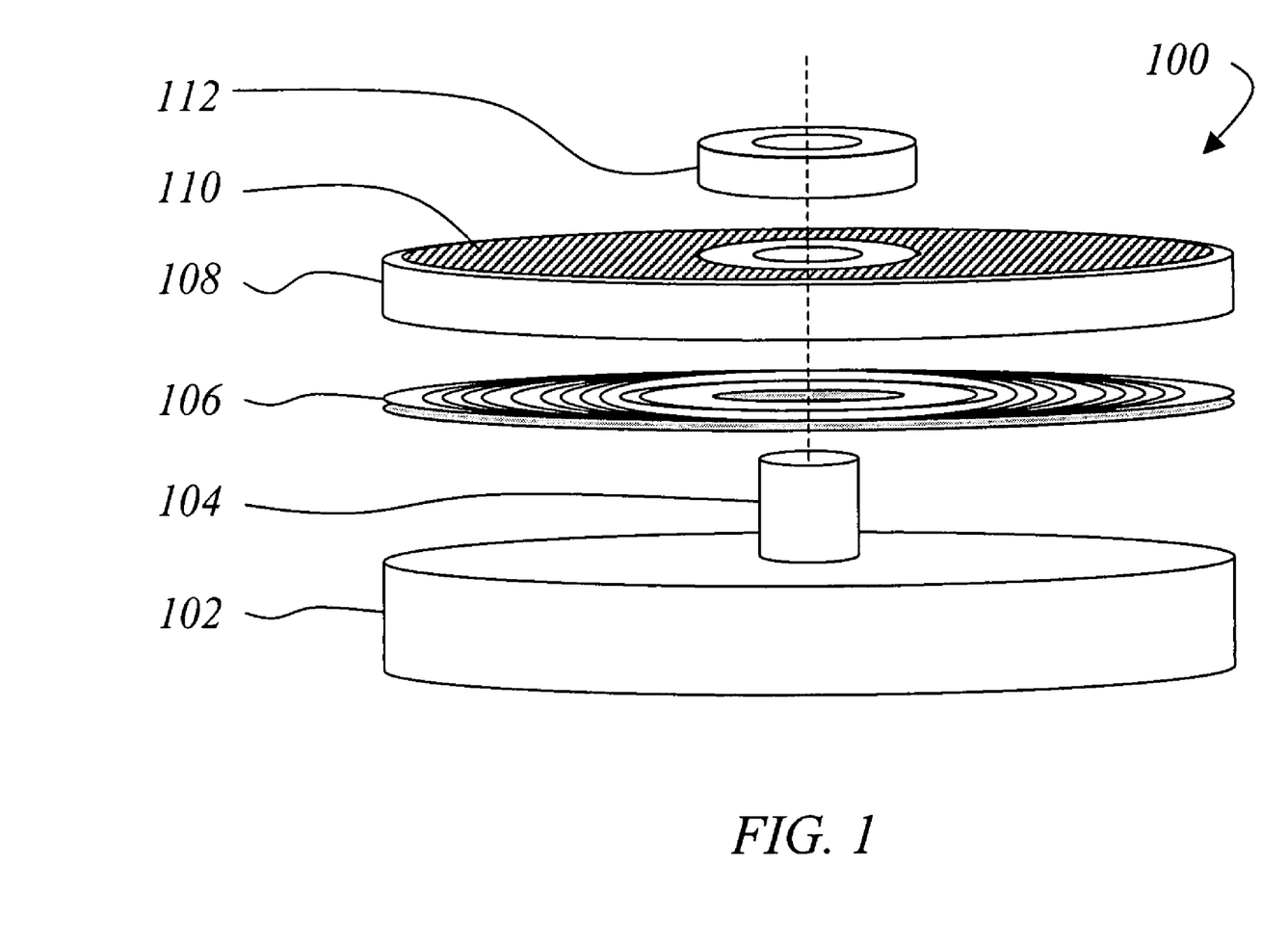
FIG. 1 shows an exploded partial view of a hard disc drive (HDD) according to an embodiment of the present invention.

In reference to FIG. 1, an exploded partial view of an example HDD 100 is shown including a motor 102 with a rotating spindle 104 as an output shaft of the motor 102. A planar inductive element 106 is mounted between the motor 102 and a flat, ring-shaped toroidal conductor 108 that may also be referred to as a rotating metallic platter 108. During normal operations, the toroidal conductor 108 for the HDD 100 is typically rotated at high speeds of 7200 or 10000 revolutions per minute (RPM) or higher. The toroidal conductor 108 has a hole formed in the center to accommodate the spindle 104. Hence, the metallic platter 108 is configured as a shorted-turn inductor that can be heated by an induced current from a magnetic field.

A magnetic surface 110 for retaining recorded data is affixed to the surface of the metallic platter 108 and a precision made clamping hub 112 secures the metallic platter to the spindle 104. Similar to the metallic platter 108, the clamping hub 112 can be made of a high melting temperature metal or metal alloy and may be manufactured to very close tolerances. Alternatively, the clamping hub 112 may be composed of aluminum. Although the planar inductive element 106 is preferably mounted between the motor 102 and the toroidal conductor 108, the planar inductive element 106 may alternatively be mounted above the magnetic surface 110.

Data is recorded on the magnetic surface 110 by enforcing a magnetic polarization pattern in particular locations along concentrically ringed tracks in which digital information data bits are stored by the orientation of magnetic dipoles with a predetermined polarization. By altering the polarization, the information stored on the magnetic media is altered. At the Curie-point temperature, magnetic substances will suddenly lose their permanent magnetization, and when the substance cools, it no longer retains its former recorded data patterns. Thus, by obscuring the polarization by heating the magnetic surface to a temperature above the Curie-point, the information stored on the magnetic surface is permanently erased.

The magnetic surface 110 may be heated to a temperature above the Curie-point and below the melting point of the magnetic surface 110 by applying an alternating current to the planar inductive element 106 for a controlled, predetermined period of time, to induce a secondary alternating current in the toroidal conductor that is dissipated within the toroidal conductor, so that any information stored on the magnetic surface 110 is erased without creating a hazardous condition such as a fire. The predetermined period of time for application of the alternating current depends on the physical construction of the fast erase HDD including such factors as the material and thickness of the toroidal conductor 108, proximity of the planar inductive element 106 to the toroidal conductor 108, the composition of the ferromagnetic material used for the magnetic surface 110, and the maximum current carrying capacity of the planar inductive element 106, for example. Although it is preferable to heat the entire magnetic surface 110 above the Curie-point so that the entire magnetic surface 110 is erased, it is not necessary. Only a sufficient portion of the magnetic surface 110 must be erased so that each discrete word of information, comprising a collection of adjacent data bits within a track of data bits, is rendered unreadable. Alternatively, the magnetic surface 110 may be affixed to a magnetically inert substrate 108 such as ceramic, glass, or a ceramic-glass composite. In this case, the second alternating current is induced within the magnetic surface 110 and is dissipated within the magnetic surface 110 to raise the temperature of the magnetic surface 110 above the Curie-point as described.

Figure 2:
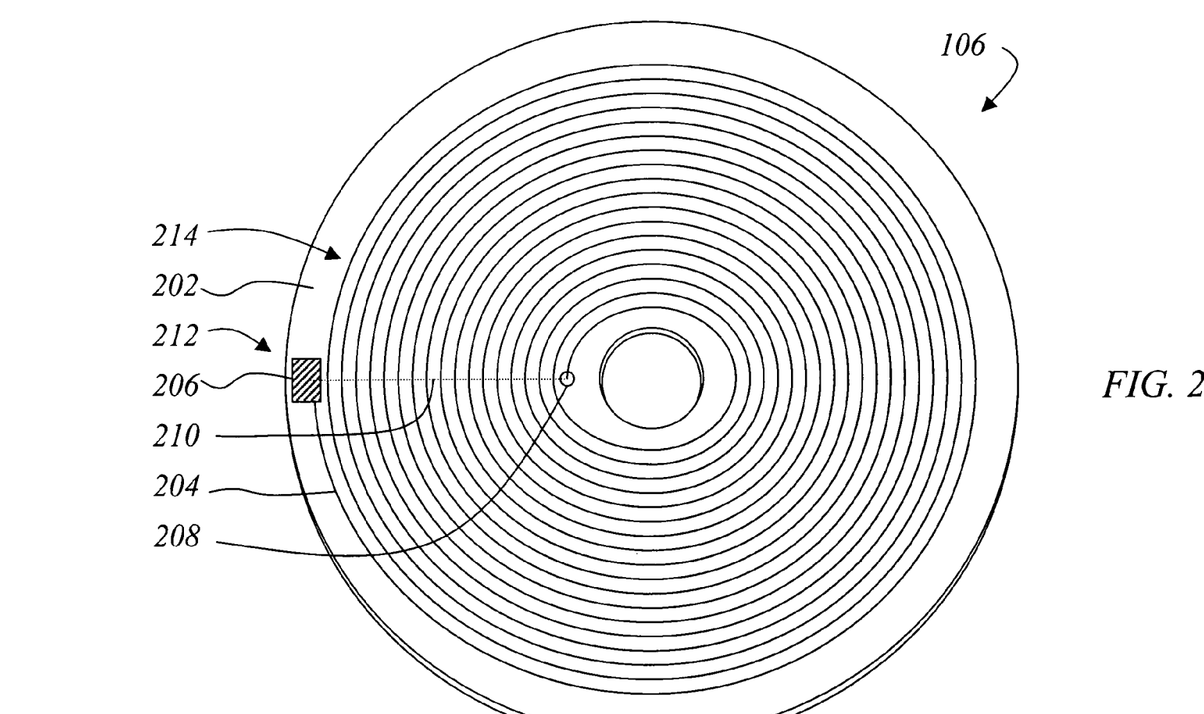
FIG. 2 shows a front perspective view of a planar inductive element according to an embodiment of the present invention.

In reference to FIG. 2, a front perspective view of the planar inductive element 106 is shown. The planar inductive element 106 may be constructed using a variety of techniques, and can include an etched-circuit technique such as used for the manufacture of printed circuit (PC) boards. In this case, the planar inductive element 106 can be formed on a planar insulating substrate 202 having a first side and a second side. A first conductor 204 is mounted in a spiral pattern on the first side of the planar insulating substrate 202. A first contact pad 206 connects to a first end of the first conductor 204 on the first side of the substrate 202 for making a first electrical connection with the planar inductor element 106. A second end of the first conductor 204 terminates at a via 208, a hole through the substrate 202, near the center of the substrate 202 and is electrically connected to a first end of a third conductor 210 on the bottom side of the substrate 202. A second contact pad 212 connects to a second end of the third conductor 210 on the bottom side of the substrate 202 for making a second electrical connection with the planar inductor element 106. Alternatively, the via 208 may be a conductive member that traverses the width of the substrate 202 for making electrical connections to the second end of the first conductor 204 and the first end of the third conductor 210.

Figure 3:
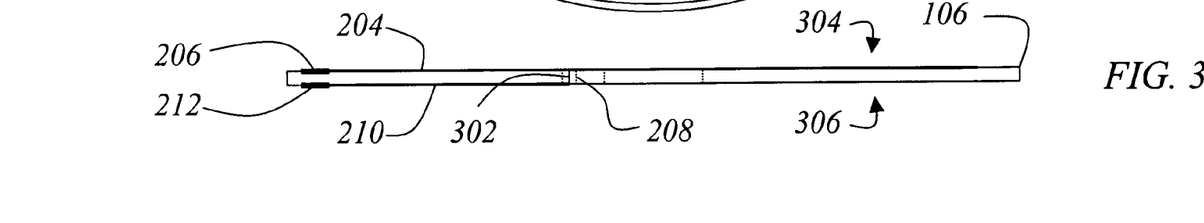
FIG. 3 shows a side cut-away view of a planar inductor member according to an embodiment of the present invention.

In reference to FIG. 3, a side cut-away view of the planar inductor member 106 is shown. The first conductor 204 is electrically connected to the third conductor 210 through a second conductor 302 that traverses the via 208 and connects the second end of the first conductor 204 with the first end of the third conductor 210. The components of the conductive path from the first contact pad 206, through the first conductor 204, through the second conductor 302, through the third conductor 210, to the second contact pad 212 constitute a single induction coil 214. The planar insulating substrate 202 has a first side 304 and a second side 306 and provides a structural framework for mounting the induction coil 214.

Figure 4:
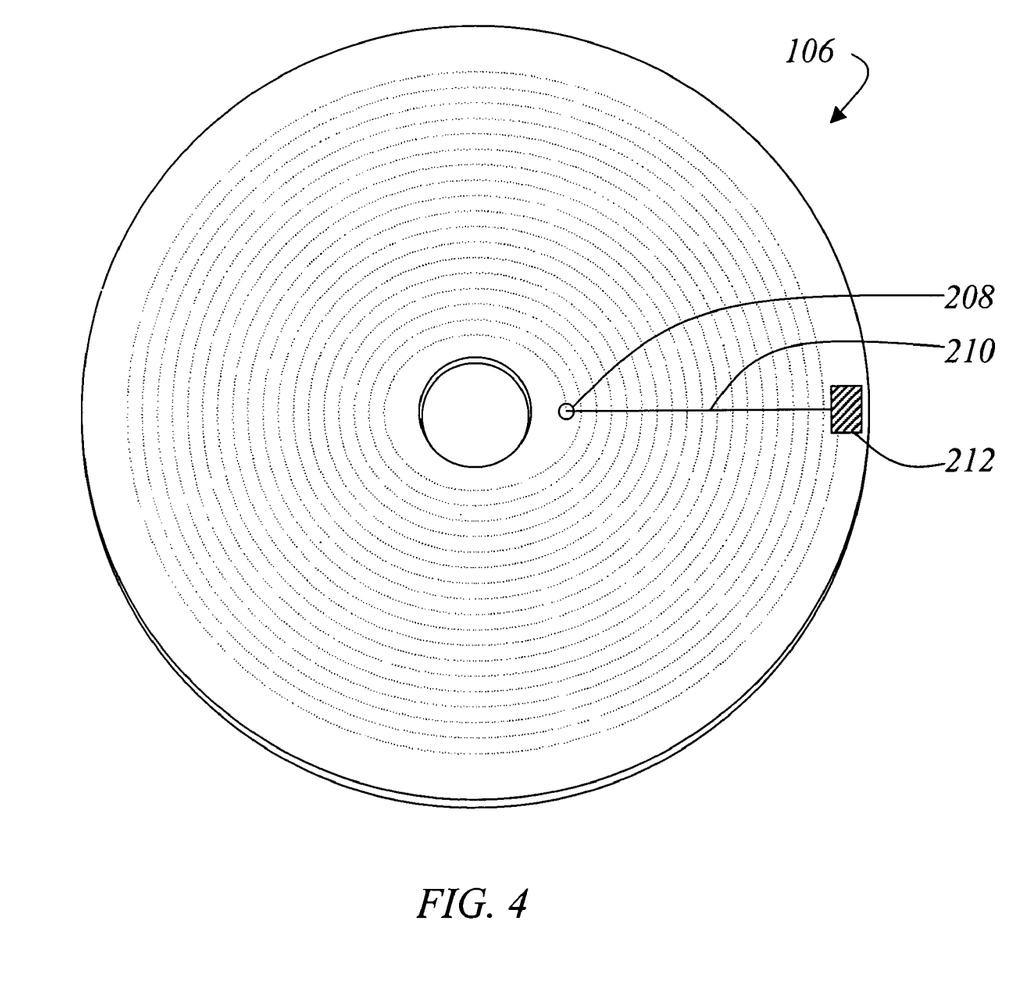
FIG. 4 shows a back perspective view of a planar inductive element according to an embodiment of the present invention.

In reference to FIG. 4, a back perspective view of the planar inductive element 106 is shown and illustrates the third conductor 210 connecting between the via 208 and the second contact pad 212. Although the planar inductive element 106 is shown with the spiral conductive pattern 204 on the top surface, the planar inductive element 106 is expected to perform as intended if the spiral conductive pattern is on the bottom surface instead. In an alternative, another spiral conductive pattern may be etched on the bottom side of the substrate 202. In yet another alternative, the planar inductive element 106 may be constructed using wire laid into grooves, or can be sandwiched between two electrically insulating, but not magnetically insulating materials.

Figure 5:
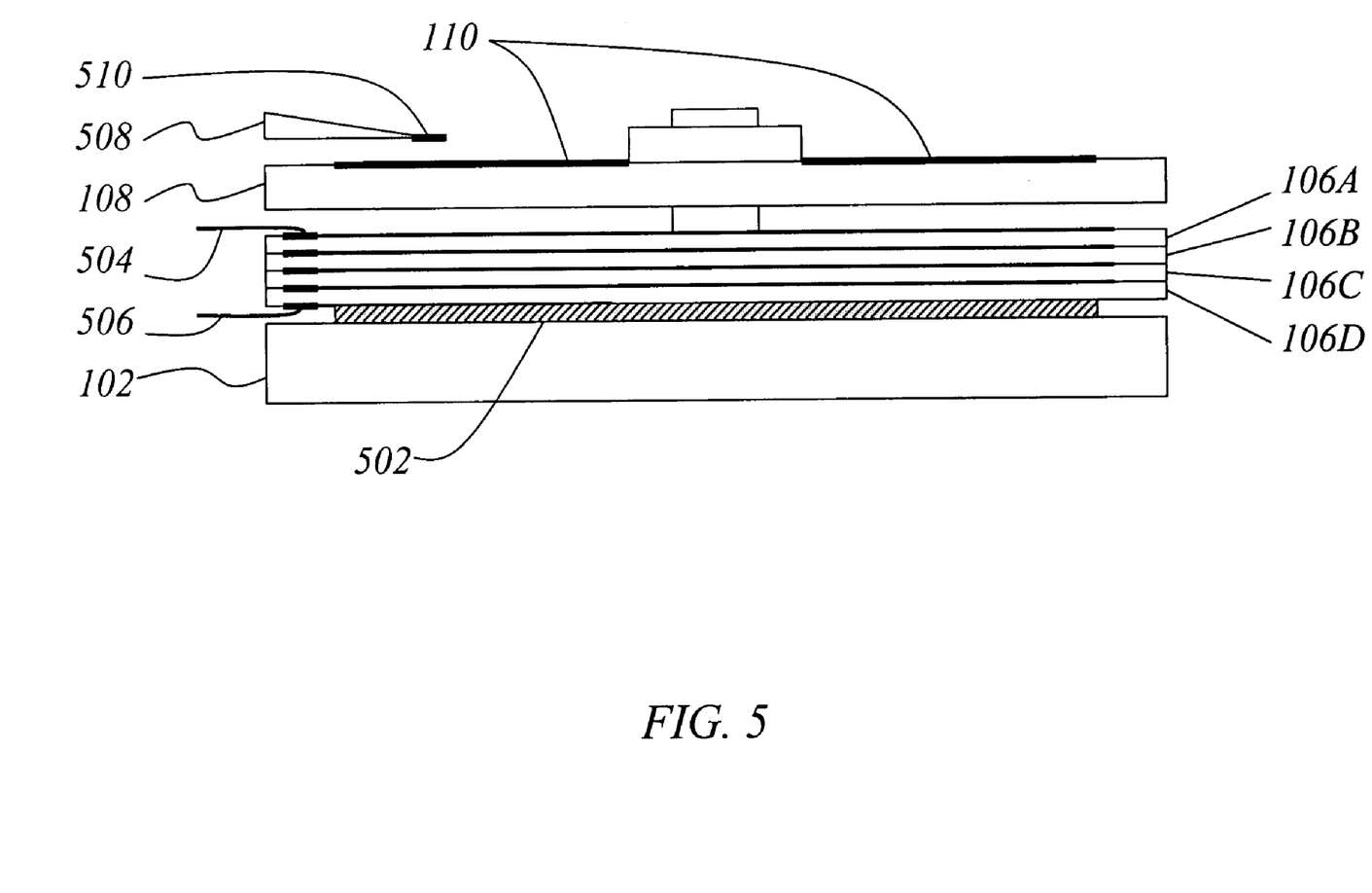
FIG. 5 shows a plurality of individual planar inductive elements sandwiched together to create single inductive element according to an embodiment of the present invention.

FIG. 5 shows another embodiment where a plurality of individual planar inductive elements (106A, 106B, 106C, 106D) are sandwiched together to create a larger inductive element above a spacer element 502. Here it is assumed that the individual planar inductive elements have electrical insulation interposed between adjacent elements, except at the contact pads. So, a first external connection wire 504 is electrically connected with the first contact pad 206 of the first planar inductive element 106A. The second contact pad 212 of the first planar inductive element 106A is electrically connected to the first contact pad 206 of the second planar inductive element 106B. Similarly, the second contact pad 212 of the second planar inductive element 106B is electrically connected to the first contact pad 206 of the third planar inductive element 106C and the second contact pad 212 of the third planar inductive element 106C is electrically connected to the first contact pad 206 of the fourth planar inductive element 106D.

In this embodiment a second external connection wire 506 is electrically connected with the second contact pad 212 of the fourth planar inductive element 106D. In this way, a series electrical connection exists between the first external connection wire 504 and the second external connection wire 506 and a plurality of planar inductive members are electrically connected in a daisy-chain manner to create a single, larger inductive element that is expected to have a larger effect than a single planar inductive element 106 alone. FIG. 5 further illustrates a head arm 508 supporting a moveable, magnetic read/write head 510 floating over the magnetic surface 110 for reading and writing information on the magnetic surface 110.

Figure 6:
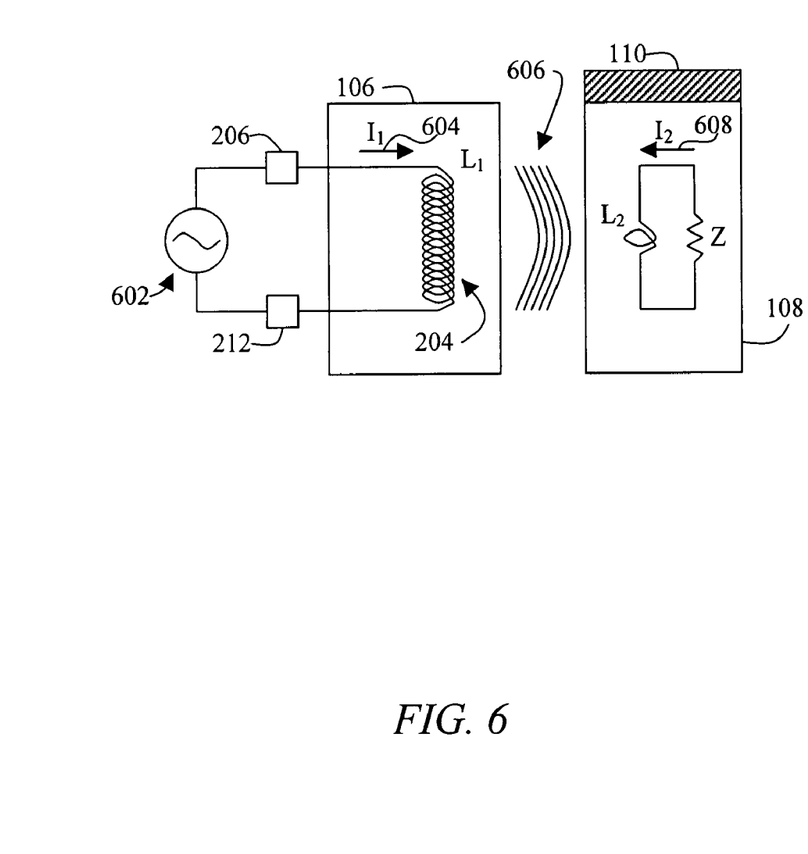
FIG. 6 shows an example of applied current flow, generation of an alternating magnetic field, and induced current flow in the toroidal conductor for erasing a magnetic media element according to an embodiment of the present invention.
Figure 7:
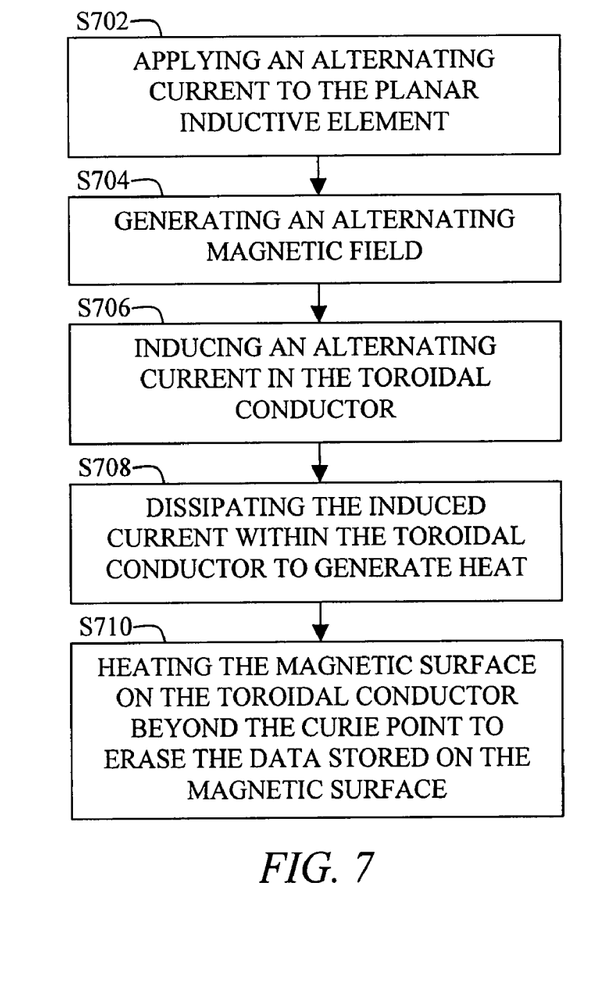
FIG. 7 shows a flow chart indicating the application of the alternating current to the planar inductive element and the resulting effects on a magnetic media element according to an embodiment of the present invention.

In reference to FIGS. 6 and 7, an example of the connection of an alternating current source 602 to supply a first alternating current 604 to the planar inductive element 106, generation of an alternating magnetic field 606, and induction of second alternating current 608 in the toroidal conductor 108 for erasing a magnetic media element is shown. The alternating current source 602 is connected to the contact pads (206, 212) of the planar inductive element 106 to complete an electrical circuit and to apply a first alternating current 604 to the planar inductive element 106 as shown in step S702.

The first alternating current 604 passes through the spiral shaped first conductor 204 and generates an alternating magnetic field 606 as in step S704. The alternating magnetic field 606 impresses upon the toroidal conductor 108 and induces a second alternating current 608 as in step S706. It is assumed that the toroidal conductor 108 is not a perfect conductor and has some impedance Z to the second alternating current 608 flow. This impedance Z causes the second alternating current 608 to dissipate the electrical energy generating heat within the toroidal conductor 108 as in step S708. The heat generated by the current dissipation is conducted to the magnetic surface 110 causing the magnetic surface 110 to increase in temperature above the Curie-point to permanently erase the data stored on the magnetic surface 110 as in step S710. Alternatively, the magnetic surface 110 may be affixed to a magnetically inert substrate 108 where the second alternating current 608 is induced within the magnetic surface 110 and is dissipated, raising the temperature of the magnetic surface above the Curie-point as described.

Figure 8:
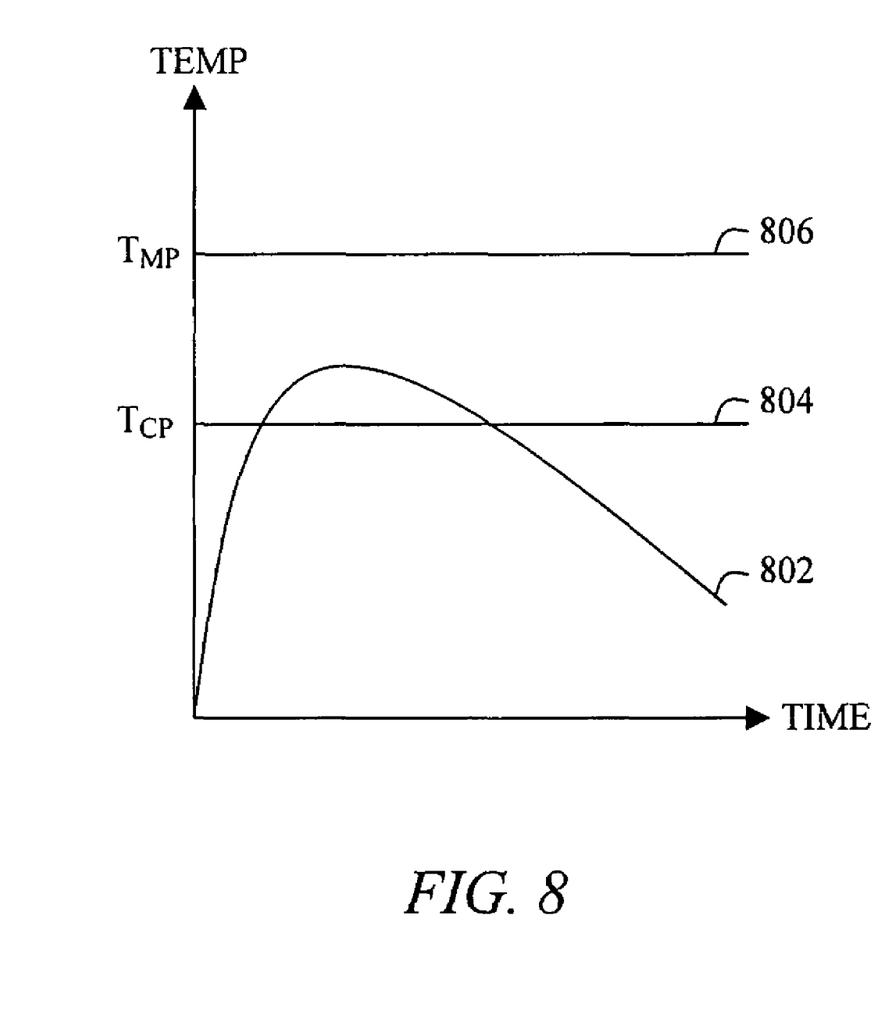
FIG. 8 shows an example temperature profile for a magnetic surface according to an embodiment of the present invention.

FIG. 8 shows an example heating profile for the magnetic surface 110 over time. Once the alternating current is applied, the temperature 802 of the magnetic surface 110 rapidly rises to exceed the Curie-point 804 in a brief but intense degaussing heat surge. After exceeding the Curie-point temperature, the first alternating current 604 flow is stopped and the temperature 802 of the metallic surface 110 begins to cool down. Once the temperature of the metallic surface has passee above the Curie-point, the metallic surface no longer retains its formerly recorded data patterns. In this case, the information previously encoded in the magnetic dipoles of the magnetic surface has become randomized rather than organized. This results in the permanent erasure of the previously stored information.

Through rapidly heating the metallic platter 108 or the magnetic surface 110 directly, the magnetically encoded information stored on the plated surfaces is destroyed. It is possible that the intense degaussing heat surge during the rapid heating described may warp the metallic platter 108 or cause blistering or de-lamination of the magnetic surface 110. This is preferred since this fast erase technique is intended be used in an emergency situation where obscuration of the stored information is of paramount importance, and preservation of the hardware for later use is a secondary consideration. Further, warping, blistering or de-lamination of the magnetic surface 110 assures that residual data cannot be gleaned by sophisticated data-recovery techniques. However, the degaussing heat surge should not last so long as to start a sustaining fire that would be a hazard to personnel. The degaussing cycle can be timed to assure that the Curie-point is quickly reached, without creating a fire hazard such as would be created using Thermite or a conventional thermal method. It is preferable that the degaussing operation can be triggered remotely which is possible by commonly-available local and wireless means. Additionally, there exist modular remote-control devices which can be activated by telephone or other signals.

The etched-circuit magnetic induction coil can be constructed with rather light, low-current, conductors since the induction coil is effectively the primary winding of a step-down transformer, in which the toroidal conductor 108 is the high-current shorted secondary winding. Since this method is intended as a destructive process, the induction coil 214 can and will be used for erasing only one time. There must be a systematic way to test the continuity of the induction coil 214 to always be assured that it will function when needed, in a similar manner as automotive air-bag actuators are tested such as by applying a small, test current to the induction coil 214 for determining continuity.

HDDs 100 are typically mass produced to exceedingly close mechanical tolerances. The clamping hub 112 represents a threat to the effectiveness of the magnetically-induced fast-erase burst since the clamping hub 112 can itself act as a shorted, single-turn inductor, that would likely shunt-away circulating current from being concentrated in the toroidal disc platter 108. Thus, it is desirable to electrically insulate the clamping hub from the toroidal disc platter 108 by inserting a precision electrical insulator (not shown) between the clamping hub 112 and the toroidal disc platter 108.

The preferred method of insulating an aluminum clamping hub 112 from the toroidal conductor 108 can be provided by hard anodizing the aluminum clamping hub 112. The aluminum-oxide film produced by the hard anodizing, is an excellent insulator, and also incurs no loss in mechanical precision of the clamping hub 112. The induction coil 214 is preferably positioned to couple most of its energy into the toroidal platter 108, rather than into the toroidal clamping hub 112, even though the clamping hub 112 is insulated from the platter.

Figure 9:
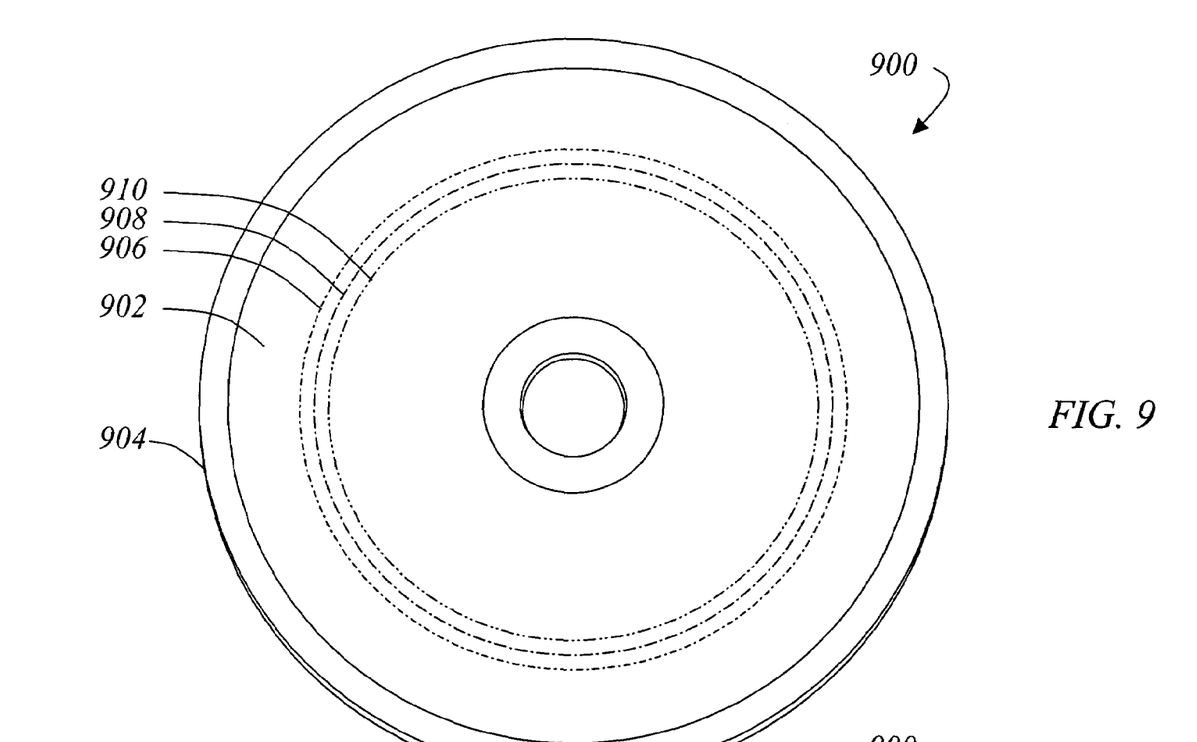
FIG. 9 shows a front perspective view of an optical disc according to an embodiment of the present invention.
Figure 10:
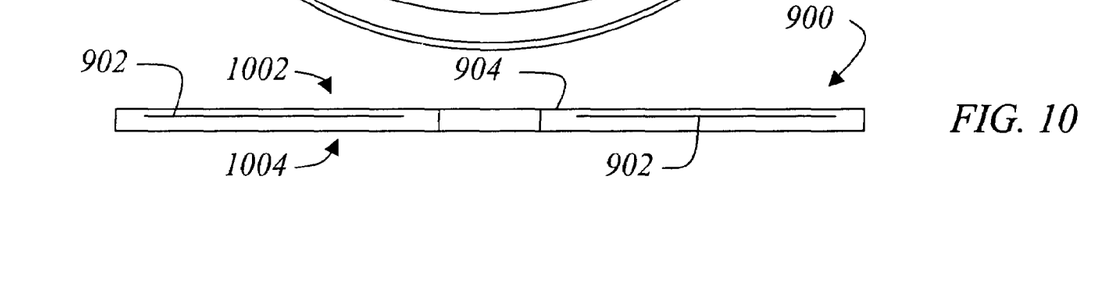
FIG. 10 shows a side view of an optical disc according to an embodiment of the present invention.
Figure 11:
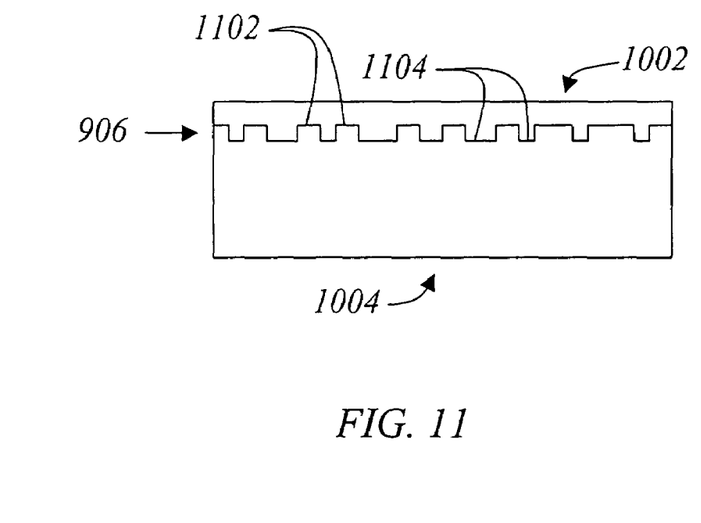
FIG. 11 shows a side view of a particular optical disc track according to an embodiment of the present invention.

In reference to FIGS. 9 to 14, embodiments for a fast-erase method and apparatus for an optical disc 900 such as a Compact-Disc Read-Only-Memory (CD-ROM) are disclosed. FIG. 9 shows a front perspective view of the optical disc 900 while FIG. 10 shows a side view of the optical disc 900. The CD-ROM 900 is constructed in a toroidal-disc form. Rather than having a rigid metallic substrate, CD-ROMs are constructed with a microscopically thin and flexible, substantially planar metallic layer 902 that has been vapor-deposited upon a somewhat flexible plastic (usually Poly-Carbonate) substrate 904. The metallic layer 902 is typically composed of aluminum, silver, or gold. Admittedly, the radial cross-sectional area of this metallic layer 902 represents an electrical conductor having a small equivalent circular-mil value. Digital data is stored in tracks (906, 908, 910) in the metallic layer 902 in the form of concentric circles having a pattern of so-called pits and lands. FIG. 11 shows a cross sectional view of an example data track 906 showing pits 1102 and lands 1104 which are transverse to the substantially planar metallic layer and define a plurality of current conducting paths.

An optical reading device such as a laser with a sensor examines the data track 906 as the disc 900 rotates. The laser may be applied at an angle to the lower side 1004 of the disc 900 so that the laser light is reflected by the pits 1102 to a first location, and reflected by the lands 1104 to a second location. Thus a sensor at either location could detect the presence of the pits 1102 or the lands 1104, respectively, and decode the data stream. It may be possible to use the Fast-Erase technique to induce a brief but intense circulating current in that thin metallic layer, sufficient to destroy it, and with it the information stored in the tracks of microscopic pits and lands which constitute the recorded data bits.

Figure 12:
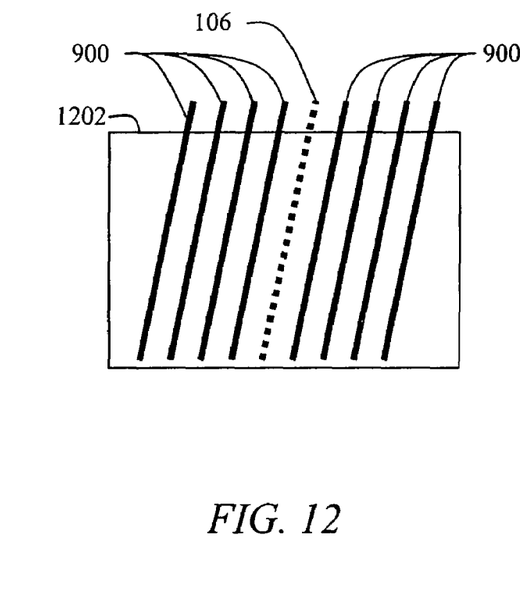
FIG. 12 shows a side view of a retaining bin with a planar inductive element near the center of the retaining bin according to an embodiment of the present invention.

Individual CD-ROMs can be Fast-Erased when they reside online within special CD-ROM drives which are configured in a similar physical way as for HDDs, as described above with a planar inductive element 106 located in proximity to the CD-ROM 900 position within the on-line Fast-Erase CD-ROM drive (not shown) itself. CD-ROMs which are being stored off-line, might be bulk-erased by housing them in a retaining bin 1202 using the fast erase excitation technique, as shown in FIG. 12. This retaining bin 1202 need not be enclosed, but be open on only one side to permit easy manual selection and removal of CD-ROMs to be immediately mounted in an on-line drive.

It would be necessary to train personnel to always keep CD-ROMs in the Fast-Erase optical drive units, or in a Fast-Erase Retaining Bin 1202, so that no loose CD-ROMs will escape erasure, should an urgent security-threat situation arise. If the majority of sensitive information is kept in electrically-readable form, within a Fast-Erase HDD, a Fast-Erase CD-ROM Drive, or a Fast-Erase Bin 1202, then sensitive data stored on the magnetic or optical media within these devices may be quickly erased in an emergency.

Figure 13:
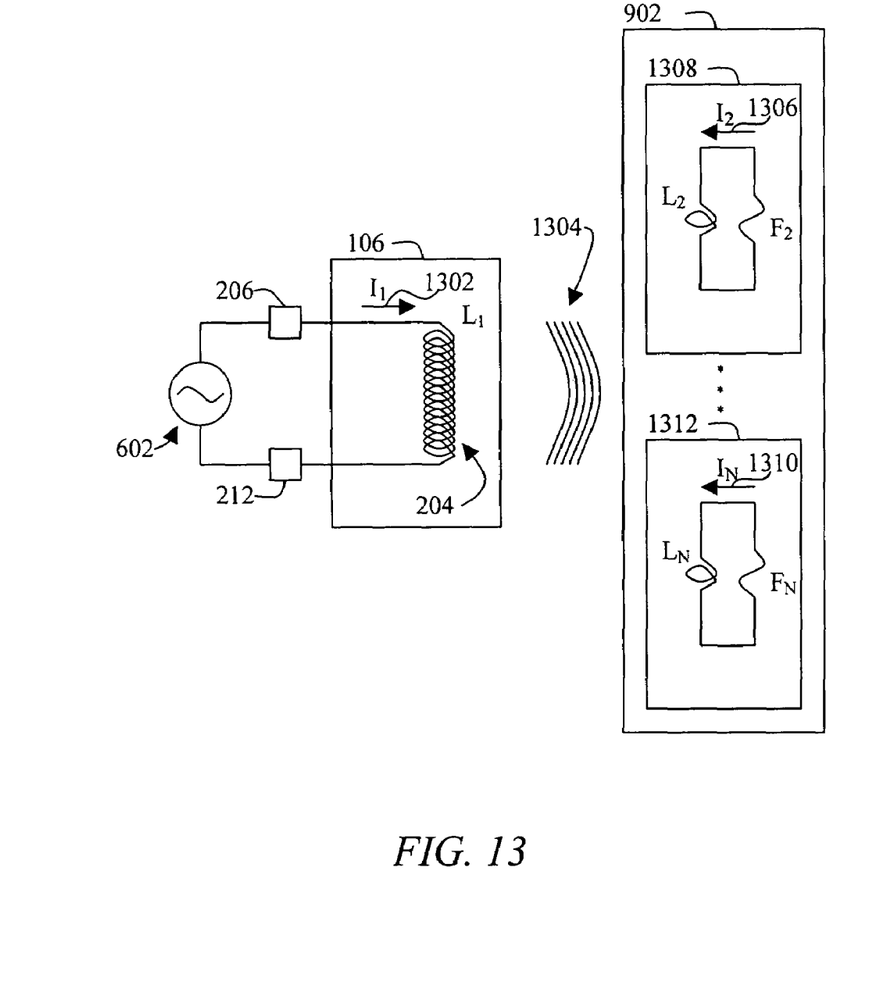
FIG. 13 shows an example of applied current flow, generation of an alternating magnetic field, and induced current flow in the metallic layer for erasing an optical media element according to an embodiment of the present invention.
Figure 14:
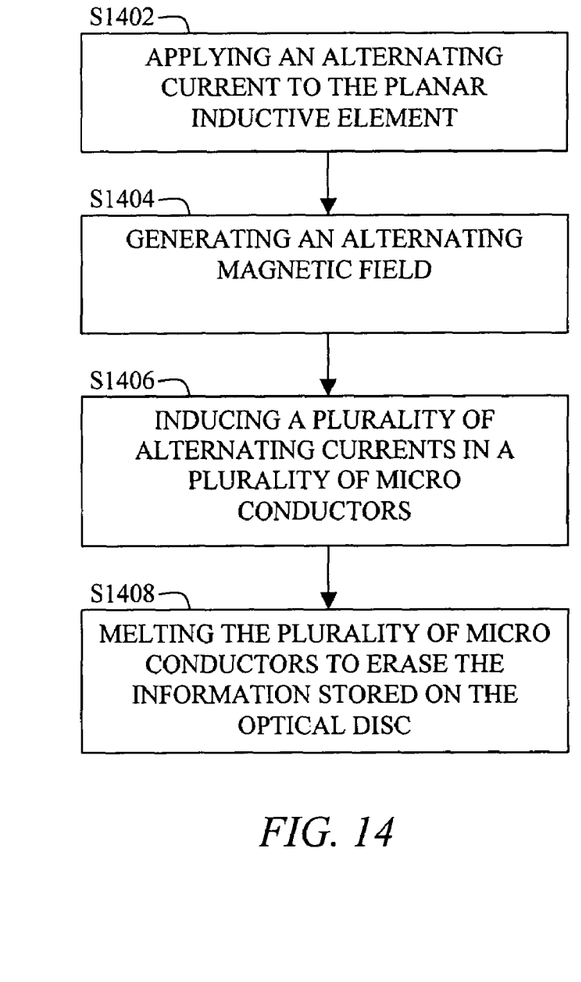
FIG. 14 shows a flow chart indicating the application of the alternating current to the planar inductive element and the resulting effects on an optical media element according to an embodiment of the present invention.

In reference to FIGS. 13 and 14, an example of application of a first alternating current 1302, generation of an alternating magnetic field 1304, and induction of a plurality of secondary alternating currents (1306, 1310) in a plurality of microconductors (1308, 1312) for erasing an optical media element is shown. The microconductors are formed between and across the optical media tracks (906, 908, 910) defined by the concentric patterns of pits 1102 and lands 1104 previously described. It is expected that the microconductors will have a irregularly sized cross-sections at some points due to the transverse separation of adjacent pits and lands so that the current carrying capacity at various cross-sections are exceeded by the induced secondary currents causing a fuse-like rupture. An alternating current source 602 is connected to the contact pads (206, 212) of the planar inductive element 106 to complete an electrical circuit and to apply a first alternating current 1302 to the planar inductive element 106 as shown in step S1402.

The first alternating current 1302 passes through the spiral shaped first conductor 204 and generates an alternating magnetic field 1304 as in step S1404. The alternating magnetic field 1304 impresses upon the toroidal conductor in the form of the thin metallic film 902 and induces a plurality of secondary alternating currents (1306, 1312) between and through a plurality of microconductors defined as conductive paths between and through the plurality of tracks (906, 908, 910) in the thin metallic film as in step S1406. The goal is to apply a first alternating current 1302 of sufficient magnitude and duration to generate a secondary alternating current 1306 of sufficient magnitude and duration that a portion of the metallic film 902 defining a microconductor 1308 surpasses the current carrying ability of the microconductor 1308 causing a fuse-like rupture or melting in the microconductor 1308 while destroying the portion of the metallic film 902 and rendering the previously stored data in proximity to the destroyed portion of the metallic film 902 unreadable.

The microconductor 1308 portion of the metallic layer 902 constitutes an inductive pickup $L_2$ where an alternating electrical current 1306 is induced by the received alternating magnetic field 1304 and a portion $F_2$ of the microconductor 1308 ruptures in a fuse-like manner by melting of a portion of the microconductor 1308. Similarly, the toroidal structure of the substantially planar metallic layer 902 constitutes a shorted-turn inductive coil for converting the alternating magnetic field 1304 into a circulating current in the metallic layer 902, as previously discussed in relation to the toroidal conductor 108.

Similarly, a plurality of microconductors (2 through N) constituting a plurality of conductive paths for the plurality of induced alternating currents should experience a localized overloading causing a localized fuse-like rupture of the conductive metallic film 902, and would obscure the data previously stored at that location. This obscuration could take the form of a removal of a portion of the reflecting metallic layer 902 in the vicinity of the rupture, and would likely affect the reading of the data in proximity to that location by the optical reading unit, as discussed above. This localized overloading of current effectively erases the data stored at the affected portion of the metallic layer 902. It is expected this behavior will be wide-spread throughout the metallic layer 902, rendering the data stored on the optical disc 900 unreadable, and effectively erased.

Those skilled in the art will appreciate that various adaptations and modifications of the just-described preferred embodiments can be configured without departing from the scope and spirit of the invention. Therefore, it is to be understood that, within the scope of the amended claims, the invention may be practiced other than as specifically described herein.

What is claimed is:

1. A fast erase method for erasing information stored on a magnetic media element in a non-contact manner, the magnetic media element including a magnetic surface affixed to a toroidal conductor, the magnetic surface storing information in a magnetic polarization pattern, the fast erase method comprising the steps of:

applying a first alternating current for a predetermined period of time to a planar inductive element operatively disposed in proximity to the toroidal conductor, the first alternating current in the planar inductive element generating an alternating magnetic field;

inducing a second alternating current in the toroidal conductor by inductively coupling the alternating magnetic field generated from the planar inductive element; and heating the toroidal conductor by dissipation of the induced second alternating current within the toroidal conductor, the magnetic surface on the toroidal conductor being heated to a predetermined temperature that exceeds the Curie-point of the magnetic surface so that the magnetic polarization pattern of the magnetic surface is disturbed and information stored on the magnetic media element is erased.

2. The method of claim 1, wherein the predetermined period of time is sufficient to heat a predetermined portion of the magnetic surface to the Curie-point, and wherein the predetermined period of time is not sufficient to ignite a sustaining fire.

3. A fast erase hard disc drive apparatus, comprising:

a toroidal metallic platter having a magnetic surface for storing information in a magnetic polarization pattern; and a planar inductive element operatively disposed in proximity to the toroidal metallic platter, the planar inductive element for receiving a first alternating current and generating an alternating magnetic field, the alternating magnetic field being coupled to induce a second alternating current in the toroidal metallic platter in a non-contact manner, the second alternating current being dissipated within the toroidal metallic platter to increase the temperature of a predetermined portion of the magnetic surface to a temperature above the Curie-point and below the Melting-point for the magnetic surface so the magnetic surface polarization pattern is disturbed and information stored on the magnetic surface polarization pattern is erased.

4. The fast erase hard disc drive apparatus of claim 3, the planar inductive element comprising:

an planar insulating substrate having a first side and a second side; and an induction coil mounted upon the planar insulating substrate.

5. The fast erase hard disc drive apparatus of claim 4, the induction coil comprising:

a first electrical conductor having a first end and a second end, the first conductor being formed in a spiral pattern and mounted upon the first side of the planar insulating substrate;

a first contact pad for electrically connecting to the first end of the first conductor;

a second conductor having a first end and a second end, the second conductor first end for electrically connecting to the first conductor second end;

a third conductor having a first end and a second end, the third conductor first end for electrically connecting to the second conductor second end;

a second contact pad for connecting to the third conductor second end, wherein the induction coil forms a single conduction path formed from the first contact pad, first conductor, second conductor, third conductor, and second contact pad.

6. The fast erase hard disc drive apparatus of claim 4, wherein the induction coil is formed by an etching process to form a conductive path.

7. The fast erase hard disc drive apparatus of claim 4, the induction coil further comprising:

spiral grooves on the first side of the planar insulating substrate for receiving a length of wire, wherein the first conductor is a length of wire placed within the spiral grooves.

8. The fast erase hard disc drive apparatus of claim 3, wherein the magnetic surface stores information in a plurality of magnetic polarization pattern tracks, and wherein the predetermined portion of the magnetic surface is sufficient to render each word of each track unreadable.

9. In a hard disc drive (HDD) for magnetically storing information, the HDD having a metallic platter with a magnetic surface for storing information data bits in locations having magnetic dipoles with a predetermined polarization, the improvement comprising:

a planar inductive element disposed adjacent to the metallic platter, the planar inductive element for conducting a first alternating electrical current that generates an alternating magnetic field in proximity to the planar inductive element, the magnetic field inducing a second electrical current in the metallic platter for heating the metallic platter so that a predetermined portion of the magnetic surface temperature is raised to the Curie-point where the polarization of the magnetic dipoles becomes randomized and the previously stored information is erased.

10. A fast erase method for erasing information stored on a magnetic media element in a non-contact manner, the magnetic media element including a magnetic surface affixed to a magnetically inert substrate, the magnetic surface storing information in a magnetic polarization pattern, the fast erase method comprising the steps of:

applying a first alternating current for a predetermined period of time to a planar inductive element operatively disposed in proximity to the magnetically inert substrate, the first alternating current in the planar inductive element generating an alternating magnetic field;

inducing a second alternating current in the magnetic surface by inductively coupling the alternating magnetic field generated from the planar inductive element; and heating the magnetic surface by dissipation of the induced second alternating current within the magnetic surface, the magnetic surface on the magnetically inert substrate being heated to a predetermined temperature that exceeds the Curie-point of the magnetic surface so that the magnetic polarization pattern of the magnetic surface is disturbed and information stored on the magnetic media element is erased.

11. The fast erase method of claim 10, wherein the magnetically inert substrate is selected from the group consisting of ceramic, glass, and a ceramic-glass composite.

* * * * *